United States Patent [19]

Freeman et al.

[11] Patent Number: 4,663,686

[45] Date of Patent: May 5, 1987

[54] HEAD CLEANING CARTRIDGE FOR MAGNETIC DISK DRIVE

[75] Inventors: Robert D. Freeman, Roy; Michael R. Lyon; Stawomir P. Kleczkowski, both of Weber County, all of Utah

[73] Assignee: Iomega Corporation, Roy, Utah

[21] Appl. No.: 573,124

[22] Filed: Jan. 23, 1984

[51] Int. Cl.[4] .......................... G11B 5/41; G11B 23/03
[52] U.S. Cl. .................................... 360/128; 360/133
[58] Field of Search .............. 360/99, 102, 128, 133, 360/137; 15/DIG. 12, 210 R; 206/444

[56] References Cited

U.S. PATENT DOCUMENTS 3,761,994  10/1973  Becht ................................. 15/210 R
4,291,353   9/1981  Fletcher et al. ...................... 360/128
4,400,748   8/1986  Bauck et al. .
4,490,765  12/1984  Nakamats ............................ 360/133

Primary Examiner—Stuart N. Hecker
Assistant Examiner—Benjamin E. Urcia
Attorney, Agent, or Firm—Woodcock Washburn Kurtz Mackiewicz & Norris

[57] ABSTRACT

A cleaning cartridge for a magnetic disk drive has a flexible cleaning pad on a wiper assembly which is rotatable in the base of the cartridge. A knob on the outside edge of the cartridge is moved back and forth to rotate the wiper assembly by a cable attached to the hub. As the assembly rotates, a cam surface forces the flexible pad into engagement with the head to clean it.

10 Claims, 10 Drawing Figures

HEAD CLEANING CARTRIDGE FOR MAGNETIC DISK DRIVE

BACKGROUND OF THE INVENTION

This invention relates to cleaning of heads of a disk drive of the type having a fixed Bernoulli plate against which a magnetic data disk is rotated.

Rigid magnetic disks are rotated adjacent to magnetic read/write heads which "fly" on an airbearing in very close proximity to the disk. Close proximity and exact tolerances allow high data densities. Consequently, rigid magnetic disks are generally used in large data processing systems. Recently, magnetic disk drives which write and read digital data from flexible magnetic disks have been extensively used. These are frequently referred to as "floppy disks." Because the disk is not rigid it cannot be rotated in close proximity to a flying head. Usually, the magnetic head contacts the surface of a floppy disk.

In both rigid and floppy disk drives of the foregoing type, the cleaning of the magnetic heads is usually accomplished by using a cleaning medium which is rotated in the same manner that the normal data disk is rotated. In rigid disk drives the cleaning material can be accurately located so that it contacts the magnetic head. In floppy disk drives, the head normally contacts the disk so that the cleaning material can merely be substituted for the data disk.

In another type of disk drive, a floppy disk is rotated in close proximity to a fixed, flat "Bernoulli" plate. The thin layer of air between the disk and the plate tends to rotate with the disk and to be thrown outwardly by centrifugal force. This creates a vacuum between the plate and disk which tends to pull the disk close to the plate and cause it to behave in a substantially rigid manner.

U.S. Pat. No. 4,400,748, "FLEXIBLE MAGNETIC DISK DRIVE USING A RIGID CARTRIDGE," Bauck et al, describes a disk drive using a Bernoulli plate to stabilize a flexible disk which is contained in a rigid cartridge which protects the disk.

In a disk drive of the type shown in the Bauck, et al patent, cleaning of the magnetic heads cannot be performed in the straightforward manner of substituting a cleaning material for a magnetic disk in the cartridge. The magnetic head in such a disk drive is relatively inaccessible; the cartridge is a rigid enclosure with limited accessibility. All of this makes cleaning of the heads in such a disk drive difficult.

It is an object of the present invention to provide a cleaning cartridge which can be used to clean the heads of a disk drive of the type shown in the aforementioned Bauck, et al patent.

SUMMARY OF THE INVENTION

In accordance with the present invention, a cleaning cartridge has a flexible pad on a wiper assembly rotatably mounted on the base of the rigid enclosure of the cartridge. The wiper assembly is rotated by a cable attached to the hub of the wiper assembly and attached to a knob on the front of the cartridge. When the knob is moved, the wiper assembly is rotated against a cam surface which forces the flexible pad on the wiper assembly into engagement with the magnetic head to clean it. A retainer is used to keep the wiper assembly in the cartridge while allowing it to rotate. The compression of the foam pad acts to return the wiper assembly to the base of the closure as the wiper assembly is rotated back to its normal position.

Stops on the base of the cartridge prevent closure of the bezel normally positioned in the opening of the disk drive. This prevents engagement of the drive motor and hub with the cleaning cartridge, thereby preventing possible damage. Contact between the components of the cleaning cartridge and the Bernoulli plate are also prevented thereby further guarding against damage of the disk drive during head cleaning.

The foregoing and other objects, features and advantages of the invention will be better understood from the following more detailed description and appended claims.

SHORT DESCRIPTION OF THE DRAWINGS

Figure 3:
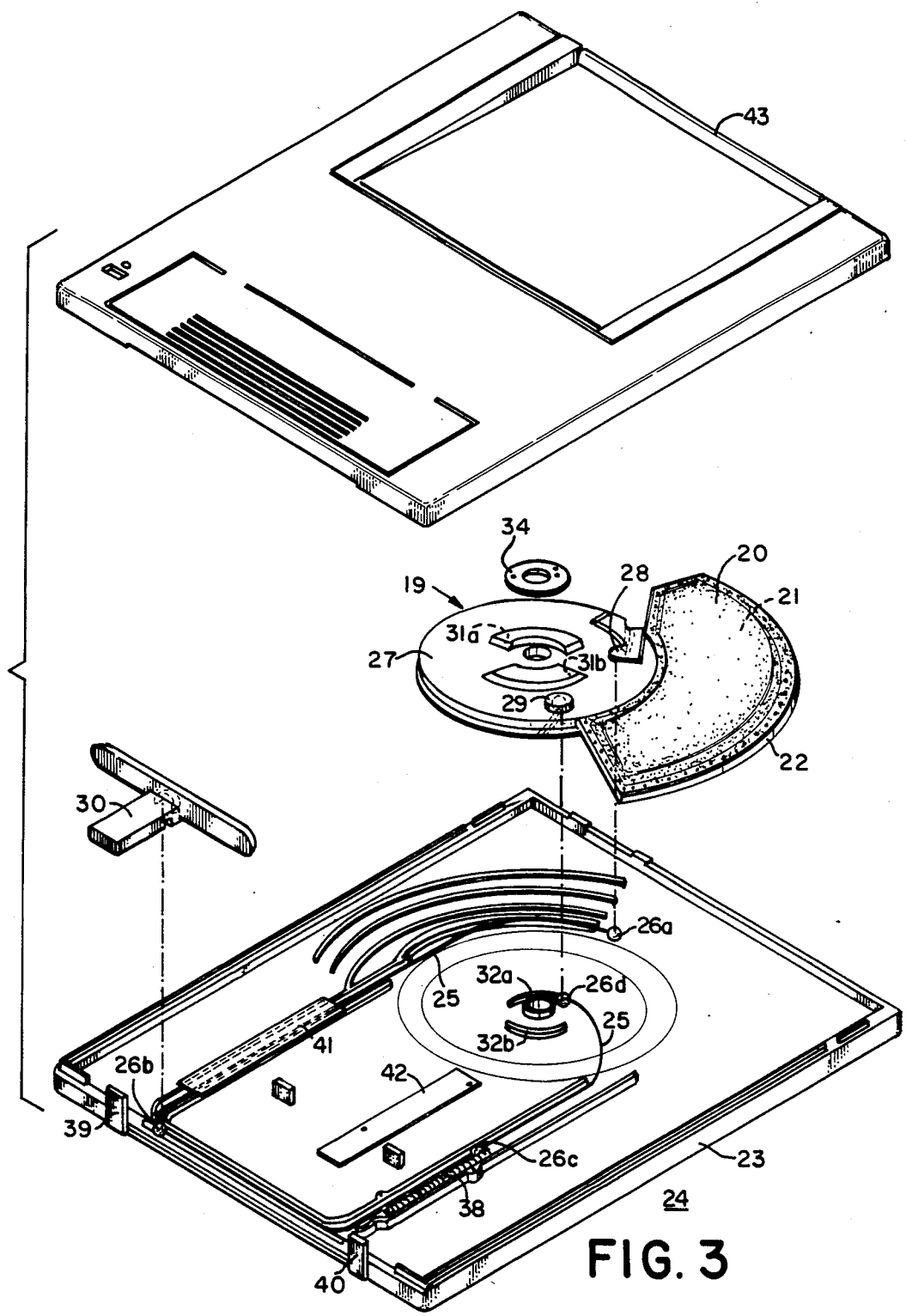
Figure 4:
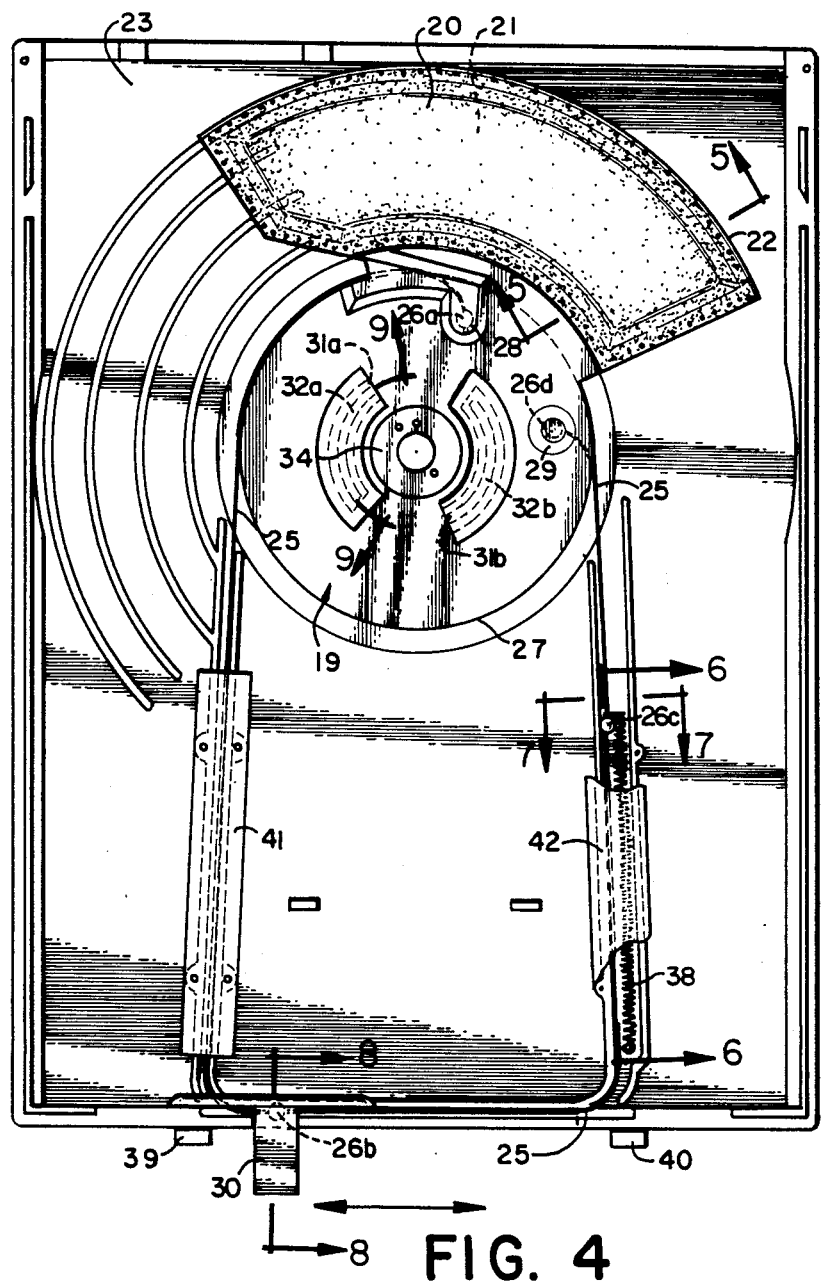
Figure 5:
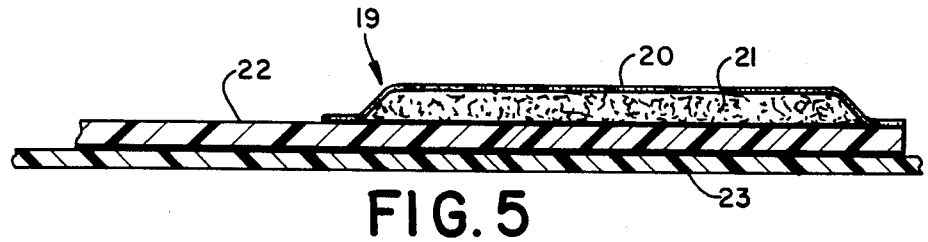
Figure 6:
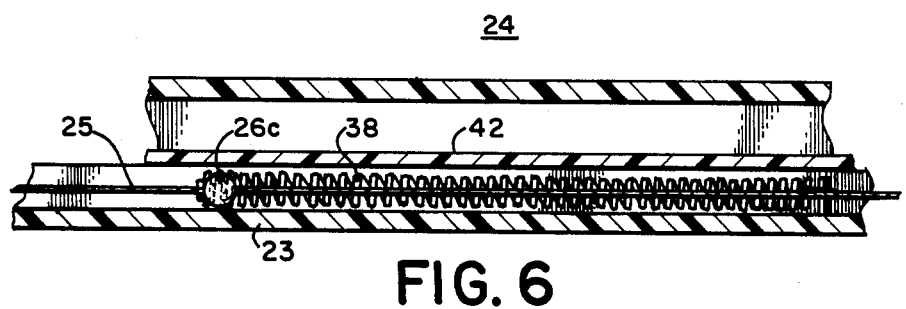
Figures 7, 8:
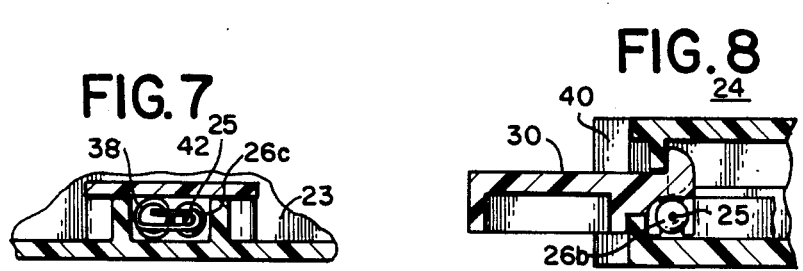
Figure 9:
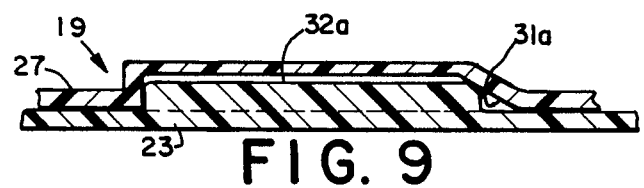

FIG. 3 is an exploded view of the top of the cartridge;
FIG. 4 is a plan view with top removed;
FIG. 5 is a section on the line 5—5 of FIG. 4;
FIG. 6 is a section on the line 6—6 of FIG. 4;
FIG. 7 is a section on the line 7—7 of FIG. 4;
FIG. 8 is a section on the line 8—8 of FIG. 4;
FIG. 9 is a section on the line 9—9 of FIG. 4.

DESCRIPTION OF THE PREFERRED EMBODIMENT

Figure 1:
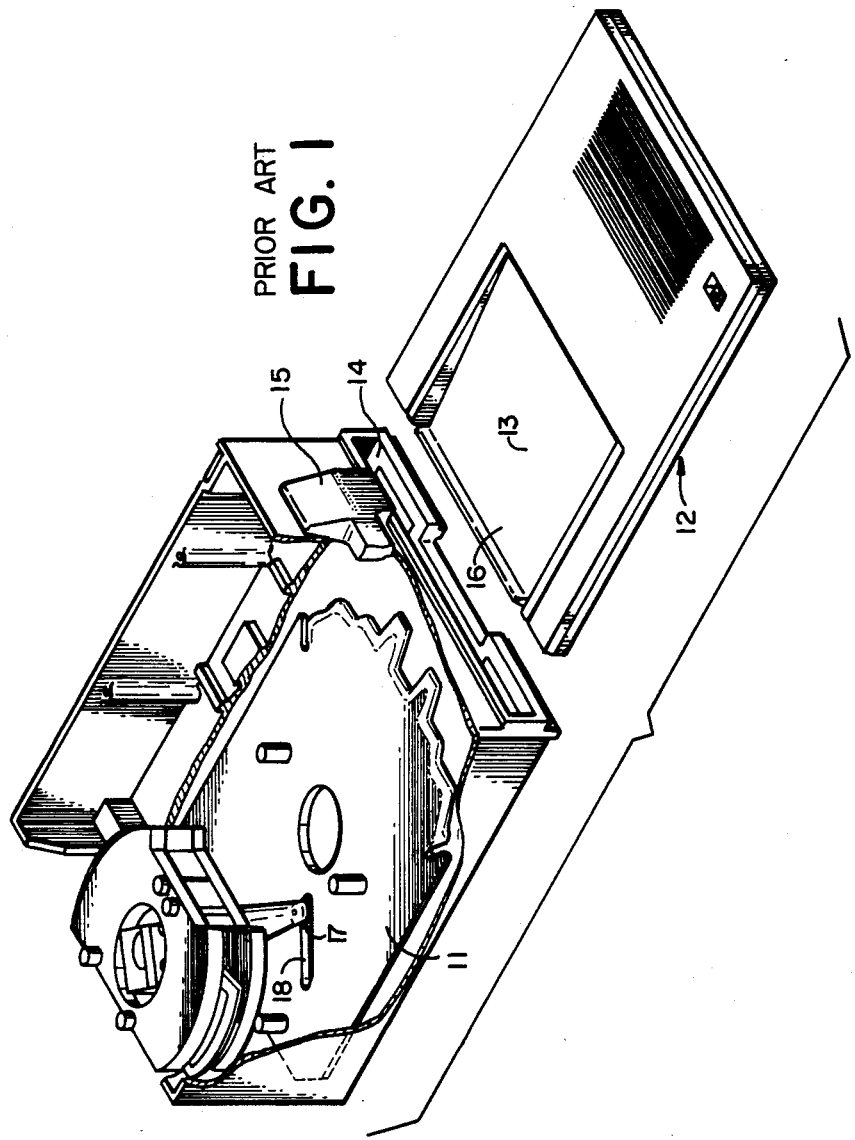
FIG. 1 shows the disk drive and cartridge of the type with which the cleaning cartridge of the present invention is used.
Figure 2A:
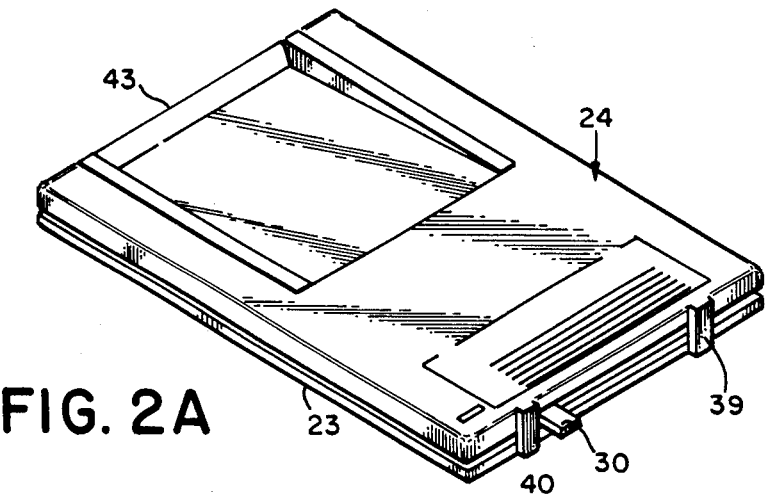
FIGS. 2A and 2B are views of the cleaning cartridge of the present invention with the slider in the closed and in the open position respectively.
Figure 2B:
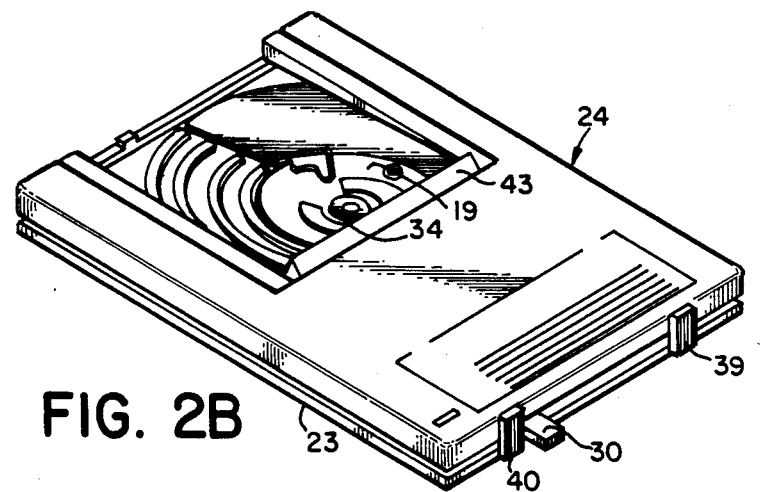

Referring to FIG. 1, the disk drive with which the cleaning cartridge of this invention is to be used, has a fixed Bernoulli plate 11 against which a magnetic data disk in a cartridge 12 is rotated by a motor having a hub which engages the disk through an opening in the cartridge. This opening is normally closed by a slider 13. When the cartridge 12 is inserted through an opening 14 in the front of the disk drive, the slider 13 is moved to its open position to expose the disk which is below the Bernoulli plate 11. When the bezel member 15 moves to a position which closes opening 14, the disk drive motor is moved downwardly so that a hub extends through opening 16 to engage the disk to rotate it against the Bernoulli plate. A magnetic head 17 extends through a slot 18 to engage the surface of the magnetic disk. All of the foregoing is described in more detail in the aforementioned Bauck, et al patents. The disk drive provides a reliable manner of rotating a disk in proximity to a recording head which rides on a thin bearing of air between the disk surface and the head. In such drives, it is not possible to clean the heads by merely substituting a head cleaning material for the magnetic disk in a cartridge, because the head cleaning material would not ordinarily be rotated against the magnetic head.

In accordance with the present invention, a head cleaning cartridge of the type shown in FIGS. 2-9 is provided. It includes a wiper assembly 19 comprising a wiper 20, a wiper 20, and a base 22. The wiper assembly is rotatably mounted in the base 23 of a rigid enclosure 24 which is of the same dimensions as the data disk cartridge 12. Wiper assembly 19 is rotated, and as it is rotated, the flexible pad 21 is forced into contact with the magnetic head.

In order to rotate the wiper assembly, cable 25 is attached to the start detent 28 of hub 27 by ball 26a.

Cable 25 is also attached to the knob 30 by ball 26b, to the spring 38 by ball 26c and to stop detent 29 by ball 26d. Knob 30 is slidable across the edge of the cleaning cartridge which is accessible through opening 14 of the disk drive. As the knob 30 is moved back and forth, the cable rotates the wiper assembly. As the wiper assembly rotates, it is forced against the head by cam surfaces 31a and 31b which ride on ribs 32a and 32b.

A retainer 34 is attached to the base 23 of the rigid enclosure to retain the wiper assembly 19 in the rigid enclosure. The flexible pad 21 returns the wiper assembly to the base of the enclosure as the wiper assembly is rotated to its normal position. Bias for returning the wiper assembly to its normal position is provided by spring 38 which is connected between one end of cable 26 and the base.

The cartridge has stops 39 and 40 which prevent the drive bezel 15 from being closed when the cleaning cartridge is inserted into the disk drive. This prevents the motor hub and motor from being moved to the engaged position in which they might be damaged.

Two covers 41 and 42 are attached to the base 23 to prevent contact between the cable 25 or the spring 38 with the Bernoulli plate 11 in the drive. This prevents potential damage to the Bernoulli plate.

The cleaning cartridge of the present invention is used in the following manner. Access is provided to the wiper assembly by moving the slider 43 from the closed position shown in FIG. 2A to the open position shown in FIG. 2B. (The slider does not have a locking mechanism which prevents manual opening of the slider as in the data disk cartridge described in the aforementioned Bauck, et al patents.) Opening the slider allows a suitable cleaning solvent to be applied to the wiper pad. The slider 43 is then closed and the cartridge is then inserted into a drive. As the knob 30 is moved back and forth, the wiper assembly forces the pad against the head, thus compressing the pad which acts as a solvent reservoir.

Foam pad density is selected to provide the proper load to the head which is low enough to prevent head damage, and high enough to ensure sufficient cleaning action. In a preferred embodiment of the invention, the pad is a non woven polyester cloth bonded to the wiper base 22. Alternatively, a replaceable pad may be used.

While a particular embodiment of the invention has been shown and described, various modifications are within the true spirit and scope of the invention. The appended claims are, therefore, intended to cover all such modifications.

What is claimed is:

1. A cleaning cartridge for cleaning the magnetic heads of a disk drive of the type having a fixed Bernoulli plate against which a magnetic data disk in a cartridge is rotated by a motor hub engaging the disk through an opening in the disk cartridge comprising:
    a generally rectangular rigid enclosure of the same dimensions as said disk cartridge;
    a head wiper assembly rotatably mounted in the base of said enclosure;
    a cam surface on said base of said rigid enclosure, said cam surface tapering away from the base of said enclosure;
    means for rotating said wiper assembly away from a normal position in which said wiper assembly is out of contact with said heads;
    said cam surface forcing said wiper assembly away from the base of said enclosure into engagement with said magnetic head as said wiper assembly rotates; and
    a flexible pad mounted on said wiper assembly, said pad acting to return said wiper assembly to the base of said enclosure as said wiper assembly is rotated to its normal position.

2. The cleaning cartridge in claim 1 wherein said means for rotating said wiper assembly comprises:
    a hub on said assembly;
    a cable attached to said hub at two circumferential points on said hub;
    a knob slidable across an edge of said enclosure, said cable being attached to said knob so that as said knob slides back and forth, said assembly is rotated.

3. The cleaning cartridge recited in claim 1 wherein said cam surface includes ribs extending from the base of said enclosure toward the top of said enclosure.

4. The cleaning cartridge recited in claim 3 further comprising:
    a slider normally closing the top of said rigid enclosure, said slider being openable to provide access to said wiper assembly, said ribs urging said wiper assembly toward said opening as said assembly is rotated.

5. The cleaning cartridge recited in claim 2 further comprising:
    a spring connected between said cable and the base of said cartridge to bias said wiper assembly toward a position at the bottom of said cam surface.

6. The cleaning cartridge recited in claim 5 wherein said cartridge is inserted into an opening in the front of said disk drive, said knob being located on an edge of said rigid enclosure, such that said knob is accessible through said opening.

7. The cleaning cartridge recited in claim 1 wherein said wiper assembly is rotatable in said rigid enclosure about the same axis as said data disk is rotatable in its cartridge.

8. The cleaning cartridge recited in claim 1 further comprising:
    a retainer attached to the base of said rigid enclosure to retain said wiper assembly in said rigid enclosure.

9. The cleaning cartridge recited in claim 1 wherein said disk drive has an opening through which cartridges are inserted and a bezel closing said opening after insertion of said cartridges, said cleaning cartridge further comprising:
    stops on the base of said cartridge to prevent closure of said bezel to protect the disk drive motor and hub from damage.

10. The cleaning cartridge recited in claim 5 further comprising:
    covers attached to the base of said enclosure preventing contact between said cables and said spring with said fixed Bernoulli plate in said disk drive.

* * * * *